United States Patent [19]
Curran et al.
[11] 3,748,374
[45] July 24, 1973

[54] MULTI-COLOR PERISCOPE VIEW SIMULATOR

[75] Inventors: William J. Curran, Orlando; John J. Kulik, Winter Park, both of Fla.

[73] Assignee: The United States of America as represented by the Secretary of the Navy, Washington, D.C.

[22] Filed: Feb. 7, 1972

[21] Appl. No.: 224,165

[52] U.S. Cl. ................ 178/6.8, 178/5.4 R
[51] Int. Cl. ................ H04n 7/18, H04n 9/04
[58] Field of Search ................ 178/5.2 R, 5.4 R, 178/6.8

[56] References Cited

UNITED STATES PATENTS

| | | | |
|---|---|---|---|
| 3,214,515 | 10/1965 | Eberline | 178/6.8 |
| 3,635,085 | 1/1972 | Shimotsuma | 178/5.4 R |
| 3,647,942 | 3/1972 | Siegel | 178/5.4 R |

*Primary Examiner*—Howard W. Britton
*Attorney*—Richard S. Sciascia, John W. Pease et al.

[57] ABSTRACT

The necessity for using expensive color cameras in a TV system to display colored foreground (and/or background) objects is avoided. A plurality of foreground objects to be displayed are colored various shades of gray and are observed by black and white TV cameras. The invention processes the camera video output signals so that they cause a color TV monitor to display the foreground objects in selected colors in a composite picture comprising a background and one or more foreground objects. The invention can be used to color the background scene as well.

1 Claim, 1 Drawing Figure

PATENTED JUL 24 1973
3,748,374
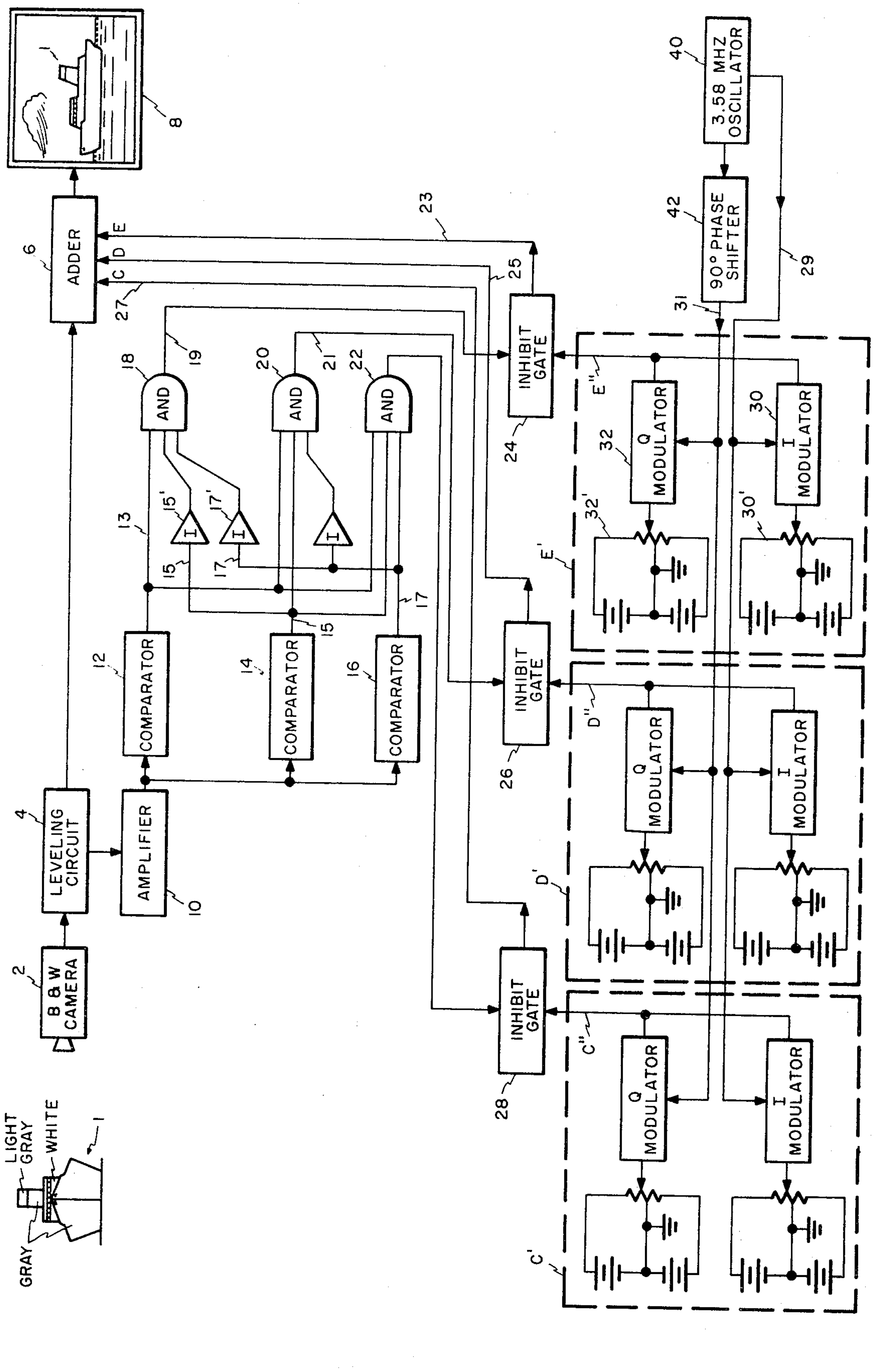

MULTI-COLOR PERISCOPE VIEW SIMULATOR

CROSS REFERENCES TO RELATED APPLICATIONS

The invention utilizes elements disclosed in applicants' co-pending application Ser. No. 191,279.

BACKGROUND OF THE INVENTION

The invention is in the field of television systems. TV systems have been used in many prior art training devices to simulate a training environment. One well known application uses a plurality of television cameras each positioned to survey a respective one of a plurality of models such as models of ships, planes, submarines, etc. Another camera may survey a background scene, e.g., a seascape. The video outputs of all the cameras are combined into a composite picture of ships, planes, etc., maneuvering against a seascape background which is displayed on one or more TV monitors. The displayed scene is observed by a trainee in a training apparatus, e.g., a reproduction of a periscope operator's station in a submarine.

Although a color presentation is highly desirable to enhance the realism of the display, trainers of this type have heretofore been restricted to black and white TV systems for various reasons. One of these reasons is the relatively great cost and complexity of color TV cameras. Since several cameras are required, the use of color rather than monochrome cameras would greatly increase the cost of a trainer. Color TV receivers used as monitors are relatively inexpensive however, and since relatively few, e.g., one or two, are used in a trainer, their cost is insignificant.

Applicants' invention enables the use of color TV monitors in a training device without requiring expensive and complex color cameras. Models are displayed in several selected colors, thus greatly increasing the realism of the display and thus the effectiveness of the training device.

SUMMARY OF THE INVENTION

The invention comprises apparatus for creating a color TV display using black and white TV cameras. Objects observed by the cameras are colored various shades of gray. The cameras respond selectively to the different shades of gray to produce video outputs of different voltages. These different voltages are converted into color information and furnished to a color TV monitor which displays the objects in colors associated with the various shades of gray. In the embodiment described, foreground objects in a composite TV picture are colored. The background can be colored using similar techniques or color background video can be read out of a video recorder.

BRIEF DESCRIPTION OF THE DRAWING

The drawing is a block diagram of the invention.

DESCRIPTION OF THE PREFERRED EMBODIMENT

The drawing shows a typical ship model 1 which is positioned in the field of view of a monochrome TV camera 2. The usual trainer will use several models and cameras, however one is enough to illustrate the principles of the invention. Model 1 is colored in, for example, three shades of gray. These can be gray, light gray, and white. The hull and lower part of the funnel are gray, the top section of the funnel is light gray, and the forecastle-bridge structure is white. Gray is represented in the drawing by diagonal lines, white by horizontal lines, and light gray is not lined.

Camera 2 scans model 1 and produces three different video output voltage levels when scanning the three differently colored parts of the model. For example, camera 2 may produce an output video signal having a voltage level of 0 when scanning black, a voltage level of 0.33 when scanning the gray parts of model 1, a voltage level of 0.66 when scanning light gray parts, and a level of 1 when scanning white. The usual camera can distinguish between several intermediate shades of gray, only three are shown here to simplify the description. The video output signal from camera 2 is sent through an automatic leveling circuit 4 for smoothing to an adder 6 where it is added to any of three color input signals C, D, and E which may be present. The summed output of adder 6 goes to a color TV monitor 8.

The output of leveling circuit 4 also goes through an amplifier 10 to the respective inputs of three comparators 12, 14, and 16.

Amplifier 10 may amplify the video signals by a suitable factor, say a factor of 10, to apply voltage levels of 3.3, 6.6, and 10 volts to comparators 12, 14, and 16. The video voltages are compared with fixed input voltages of 3.3, 6.6, and 10 volts in the respective comparators. When the video voltage has a level of 3.3 volts comparator 12 will have an output and comparators 14 and 16 which are biased to 6.6 and 10 volts respectively, will have none. The output of 12 is applied via a lead 13 to a first input of a three input AND gate 18. Comparators 14 and 16 are connected to second and third inputs of AND gate 18 through lines 15 and 17 and respective inverters 15' and so that gate 18 is actuated to remove an inhibiting signal from a line 19 which is applied to an inhibiting gate 24. This permits gate 24 to pass a color signal E to the E input of adder 6.

When the video voltage from amplifier 10 reaches a level of 6.6 volts both comparator 12 and comparator 14 will develop an output signal. Comparator 16 will not develop an output signal because the video voltage level is below its bias voltage level of 10 volts. AND gate 18 will be inactivated by the inverted output signal from comparator 14 on line 15. An AND gate 20 will be actuated by signals applied to its first and second inputs over lines 13 and 15 from comparators 12 and 14 and by the inverted NOT signal applied to its third input over a line 17 from comparator 16. The signal from AND gate 20 is applied over a line 21 to actuate an inhibit gate 26 to pass a color signal D over a line 25 to the D input terminal of adder 6. When the video signal reaches a level of 10 volts, comparator 16 applies a signal to AND gate 22 on line 17. AND gate 22 also receives signals on lines 13 and 15 from comparators 12 and 14. Both AND gates 18 and 20 are inactivated by inverted signals from 14 and 16 on lines 15 and 17. The output signal from AND gate 22 enables an inhibit gate 28 to pass a color signal C over a line 27 to the C input of adder 6.

The C, D, and E color signals are developed by three respective color circuits C', D', and E'. Color circuit E' is comprised of an "I" modulator 30 and a "Q" modulator 32. The I modulator 30 uses a DC voltage derived from a potentiometer 30' to modulate a 3.58 MHz signal received over a line 29 from an oscillator 40. The Q modulator 32 uses a DC signal derived from a potentiometer 32' to modulate a 3.58 MHz signal from oscillator 40 which has been phase shifted 90° by a phase shifter 42. A line 31 connects 42 to 32. The modulated output signals from 30 and 32 are combined on a line E'' which is connected to one input of inhibit gate 24. The output of gate 24 is connected by a line 23 to the E input of adder 6 as previously described.

Color circuits D' and C' are identical to color circuit E' and will not be described. Color circuit D' provides an output signal on a line D'' to inhibit gate 26. Circuit C' provides an output signal on a line C'' to inhibit gate 28. The summed output signal from adder 6 may be applied to a color TV monitor 8 where an image 1' of model 1 is reproduced in three colors. In a practical system the output signal from adder 6 may be processed in complex apparatus which combines the images of several models into one picture and enables the model images to move on the monitor screen to simulate naval maneuvers. However this is not part of the present invention.

The colors of model image 1' may be selected by adjusting potentiometers such as 30' and 32' in color circuits C', D', and E'. This regulates the color signals applied to adder 6. The combined Q modulator and I modulator outputs are such that when added to the video signal from leveling circuit 4, a particular color is displayed on monitor 8. For example, when camera 2 scans the gray hull or lower part of the funnel of model 1, the output voltage of amplifier 10 may reach a level of 3.3 volts causing the comparators 12, 14, and 16 to actuate AND gate 18, thus revoving an inhibiting signal from gate 24 and applying color signal E to adder 6. Potentiometers 30' and 32' may be adjusted to regulate color signal E so that the hull of model image 1' on the screen of monitor 8 is black. When the white bridge-forecastle area of model 1 is scanned, the output voltage level of amplifier 10 is such that gate 26 passes color signal D to adder 6. Color signal D may be such that the bridge-forecastle area of model image 1' is white. When the light gray top of the smokestack of model 1 is scanned, color signal C may be passed to adder 6 to color the top of the funnel of image 1' red. Other colors could be selected; the colors described by way of example are typical of merchant vessels.

The invention is not limited to three colors. Several more shades of gray, ranging from black to white, can be applied to a model and additional selecting circuits can be used to obtain a wider variety of colors in the display. It is only necessary that there be sufficient difference between the shades of gray for the camera to develop video output voltage levels which the selecting circuits can distinguish. In the embodiment described, by way of example, color background video signals may be obtained from a video recorder, or a background scene in various shades of gray may be observed by a monochrome camera in the manner described to obtain a colored background display. The invention is not limited to using different shades of gray or colors on models to obtain different video voltages from the observing camera. Any surface characteristic of the model resulting in distinguishable video voltages is usable.

We claim:

1. In a television system having at least one monochrome television camera and at least one color television receiver for displaying a televised scene, an object colored at least one selected shade of gray and positioned in the field of view of said camera, said shade of gray being selected to cause said camera to develop distinctive video output voltage levels in response to scanning different shades of gray, coloring means responsive to said video voltage levels connecting said camera and said receiver for adding a color signal to said video voltage level to cause said receiver to display said object in color, said coloring means including at least one adjustable color circuit for developing a selected color signal, means for adding said selected color signal to said video voltage level, a plurality of said adjustable color circuits, selecting means for selecting a particular color circuit to supply a selected color signal to said adding means, said selecting means including comparator means for comparing said video voltage level with a reference voltage, said comparator means developing a particular output voltage pattern in response to a particular video voltage level, gating means connected to said comparator means and said color circuits for gating selected color signals to said adding means in response to said comparator output voltage pattern, each of said color circuits comprising an "I" modulator, an oscillator connected to furnish a selected frequency to said I modulator, a first potentiometer connected to furnish a modulating voltage to said I modulator to modulate said frequency, a "Q" modulator, a phase shifter connected to said oscillator to receive said frequency and connected to furnish a phase shifted frequency to said Q modulator, a second potentiometer connected to furnish a modulating voltage to said Q modulator to modulate said phase shifted frequency, and a common output line for combining a modulated frequency from said I modulator and a modulated phase shifted frequency from said Q modulator to form a color signal.

* * * * *